US011394842B2

(12) United States Patent
Ooki

(10) Patent No.: US 11,394,842 B2
(45) Date of Patent: Jul. 19, 2022

(54) IMAGE READING APPARATUS DETERMINES WHETHER A DOCUMENT IS CHROMATIC OR ACHROMATIC AND PERFORMING A CONVEYANCE SPEED OF A DOCUMENT BASED ON THE SETTING OF A COLOR DETERMINATION, AND PERFORMING CONVEYANCE SPEED BASED ON SETTING OF AN OUTPUT RESOLUTION WITHOUT SETTING WHETHER TO PERFORM A COLOR DETERMINATION

(71) Applicant: CANON KABUSHIKI KAISHA, Tokyo (JP)

(72) Inventor: Kenji Ooki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/156,212

(22) Filed: Jan. 22, 2021

(65) Prior Publication Data

US 2021/0243322 A1 Aug. 5, 2021

(30) Foreign Application Priority Data

Feb. 5, 2020 (JP) ............................ JP2020-018310

(51) Int. Cl.
*H04N 1/00* (2006.01)
*H04N 1/10* (2006.01)
(Continued)

(52) U.S. Cl.
CPC ..... *H04N 1/00822* (2013.01); *H04N 1/00689* (2013.01); *H04N 1/00694* (2013.01);
(Continued)

(58) Field of Classification Search
CPC ........... H04N 1/00689; H04N 1/00694; H04N 1/00737; H04N 1/00822; H04N 1/1039; H04N 1/1215
(Continued)

(56) References Cited

U.S. PATENT DOCUMENTS 6,567,192 B1 * 5/2003 Toyomura .......... H04N 1/40068 358/497
9,467,584 B2 10/2016 Ooki .................. H04N 1/00814
(Continued)

FOREIGN PATENT DOCUMENTS

JP 2008-306396 12/2008
JP 2013085172 A * 5/2013 ............... H04N 1/04

*Primary Examiner* — Chad Dickerson
(74) *Attorney, Agent, or Firm* — Venable LLP

(57) ABSTRACT

An image reading apparatus includes a document tray on which a document is stacked; a conveyance unit configured to convey the document stacked on the document tray; a reader configured to read the image of the document conveyed by the conveyance unit using a sensor. The sensor includes a first light receiving element row having a plurality of light receiving elements, which receives light of a first color, arranged in a main scanning direction; and a second light receiving element row having a plurality of light receiving elements, which receives light of a second color, arranged in the main scanning direction, wherein the first light receiving element row and the second light receiving element row are arranged in a sub-scanning direction orthogonal to the main scanning direction. The image reading apparatus further includes a setting unit and a determination unit.

6 Claims, 7 Drawing Sheets

(51) Int. Cl.
*H04N 1/12* (2006.01)
*G06F 3/12* (2006.01)

(52) U.S. Cl.
CPC ....... *H04N 1/00737* (2013.01); *H04N 1/1039* (2013.01); *H04N 1/1215* (2013.01)

(58) Field of Classification Search
USPC ....... 358/474, 496, 497, 505, 514, 512, 1.12
See application file for complete search history.

(56) References Cited

U.S. PATENT DOCUMENTS

| | | | | |
|---|---|---|---|---|
| 10,834,282 | B2 | 11/2020 | Ooki | H04N 1/401 |
| 2002/0145765 | A1* | 10/2002 | Chou | H04N 1/3875<br>358/474 |
| 2005/0018267 | A1* | 1/2005 | Ando | H04N 1/00037<br>358/505 |
| 2008/0123162 | A1* | 5/2008 | Sugiura | H04N 1/00795<br>358/488 |
| 2009/0091807 | A1* | 4/2009 | Kagami | H04N 1/12<br>358/486 |
| 2012/0250100 | A1* | 10/2012 | Kuraya | H04N 1/0417<br>358/448 |
| 2021/0037158 | A1 | 2/2021 | Ooki et al. | H04N 1/40093 |

* cited by examiner

PLATEN COVER READING

| COLOR SELECTION | READING RESOLUTION (dpi) | OPERATION UNIT SELECTION (OUTPUT) RESOLUTION (dpi) | ACS SETTING |
|---|---|---|---|
| COLOR | 300x300 | 300 x 300 | OFF |
| | 600x600 | 600 x 600 | OFF |
| MONOCHROME | 600x600 | 600 x 600 | OFF |
| ACS (COLOR/MONOCHROME) | **300 x 600** | **300 x 300** | **ON** |
| | 600x600 | 600 x 600 | ON |

FIG. 8A

FLOW READING

| COLOR SELECTION | READING RESOLUTION (dpi) | OPERATION UNIT SELECTION (OUTPUT) RESOLUTION (dpi) | ACS SETTING |
|---|---|---|---|
| COLOR | 300x300 | 300 x 300 | OFF |
| | 600x600 | 600 x 600 | OFF |
| MONOCHROME | 600x600 | 600 x 600 | OFF |
| ACS (COLOR/MONOCHROME) | **300 x 600** | **300 x 300** | **ON** |
| | 600x600 | 600 x 600 | ON |

FIG. 8B

IMAGE READING APPARATUS DETERMINES WHETHER A DOCUMENT IS CHROMATIC OR ACHROMATIC AND PERFORMING A CONVEYANCE SPEED OF A DOCUMENT BASED ON THE SETTING OF A COLOR DETERMINATION, AND PERFORMING CONVEYANCE SPEED BASED ON SETTING OF AN OUTPUT RESOLUTION WITHOUT SETTING WHETHER TO PERFORM A COLOR DETERMINATION

BACKGROUND OF THE INVENTION

Field of the Invention

The present disclosure relates to an image reading apparatus to read an image from a document.

Description of the Related Art

There is known an image reading apparatus in which a document placed on a platen glass is pressed with a platen cover, and a scanning operation of reading an image of the document is performed line by line with an image sensor. Hereinafter, a scanning operation performed with a document placed on the platen glass, as described above, is referred to as "platen cover reading". In the platen cover reading, the image of the document is read while moving an image sensor (CIS: Contact Image Sensor) along with a guide member. A moving direction (sub-scanning direction) of the image sensor is a direction orthogonal to a main scanning direction, i.e., a direction along which an image sensor scanning is performed.

In an image reader having an automatic document feeder (ADF), a scan operation is performed. In the scan operation, an image of the document is read by a CIS, which is fixed to a predetermined position (hereinafter referred to as "flow reading position"), while images are conveyed one by one. The scanning operation performed while conveying the document as described in the above is hereinafter referred to as "flow reading". In the flow reading, a plurality of the documents are continuously fed from an original tray of the ADF. The image sensor can continuously read images of a plurality of documents.

In an image reading apparatus such as a copying machine or a scanner, there is known a configuration in which a determination, based on a scanned image, as to whether the scanned image is an achromatic image or a chromatic image is made. Based on the determination result, the above image reading apparatus automatically determines whether to output a color image or a black-and-white (monochrome) image. Hereinafter, the processing of determining whether the scanned image is achromatic or chromatic and selecting whether to output a color image or a monochrome image based on the determination result is described as automatic color selection (ACS: Automatic Color Selection). Japanese Unexamined Patent Publication No. 2008-306396 discloses an example of such an automatic color selection technique.

The CIS used for reading the image of the original includes a line sensor R which receives red (R) light, a line sensor G which receives green (G) light, and a line sensor B which receives blue (B) light, and each of the line sensors is arranged in a sub-scanning direction. In a case where a position of the document to be read by the line sensor R, a position of the document to be read by the line sensor G, and a position of the document to be read by the line sensor B are not the same in the sub-scanning direction, the following problems may occur. Specifically, an image reading apparatus may detect an edge portion of a black line in an image of the original as a chromatic image. If color of the edge portion of the black line is detected to be chromatic as described above, an erroneous determination may occur. Due to the erroneous determination of ACS, even for a monochrome document, a color image is formed, therefore, the time required for a copy operation and/or the running cost is increased.

In view of the above, an object of the present disclosure is to prevent, in an image reading apparatus, an erroneous determination in determining whether an image of a document is an achromatic image or a chromatic image.

SUMMARY OF THE INVENTION

An image reading apparatus according to the present disclosure includes: a document tray on which a document is stacked; a conveyance unit configured to convey the document stacked on the document tray; a reader configured to read the image of the document conveyed by the conveyance unit using a sensor, the sensor comprising: a first light receiving element row having a plurality of light receiving elements, which receives light of a first color, arranged in a main scanning direction; and a second light receiving element row having a plurality of light receiving elements, which receives light of a second color, arranged in the malin scanning direction, wherein the first light receiving element row and the second light receiving element row are arranged in a sub-scanning direction orthogonal to the main scanning direction, a setting unit configured to set a resolution for reading, by the reader, an image of the document to one of a first resolution or a second resolution which is higher than the first resolution; and a determination unit configured to determine whether the document read by the reader is a chromatic document or an achromatic document based on a reading result of the reader, wherein the reader is configured to read, when determining whether the document is the chromatic document or the achromatic document by the determination unit, the image of the document in the second resolution regardless of the resolution set by the setting unit.

Further features of the present invention will become apparent from the following description of exemplary embodiments (with reference to the attached drawings).

BRIEF DESCRIPTION OF THE DRAWINGS

FIG. 8A and FIG. 8B are exemplary diagrams of a reading resolution, a designated resolution input by an operation unit selection, and an ACS setting selected by a user.

DESCRIPTION OF THE EMBODIMENTS

Figure 1:
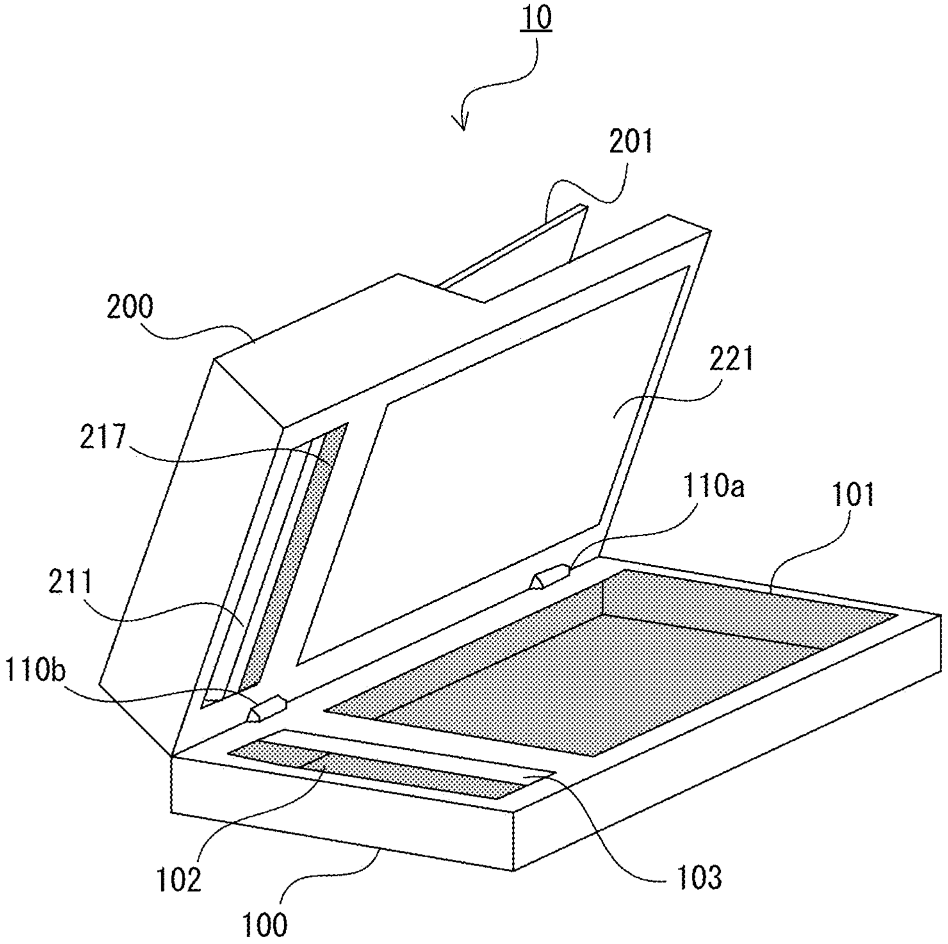
FIG. 1 is a perspective view of an image reading apparatus.
Figure 2:
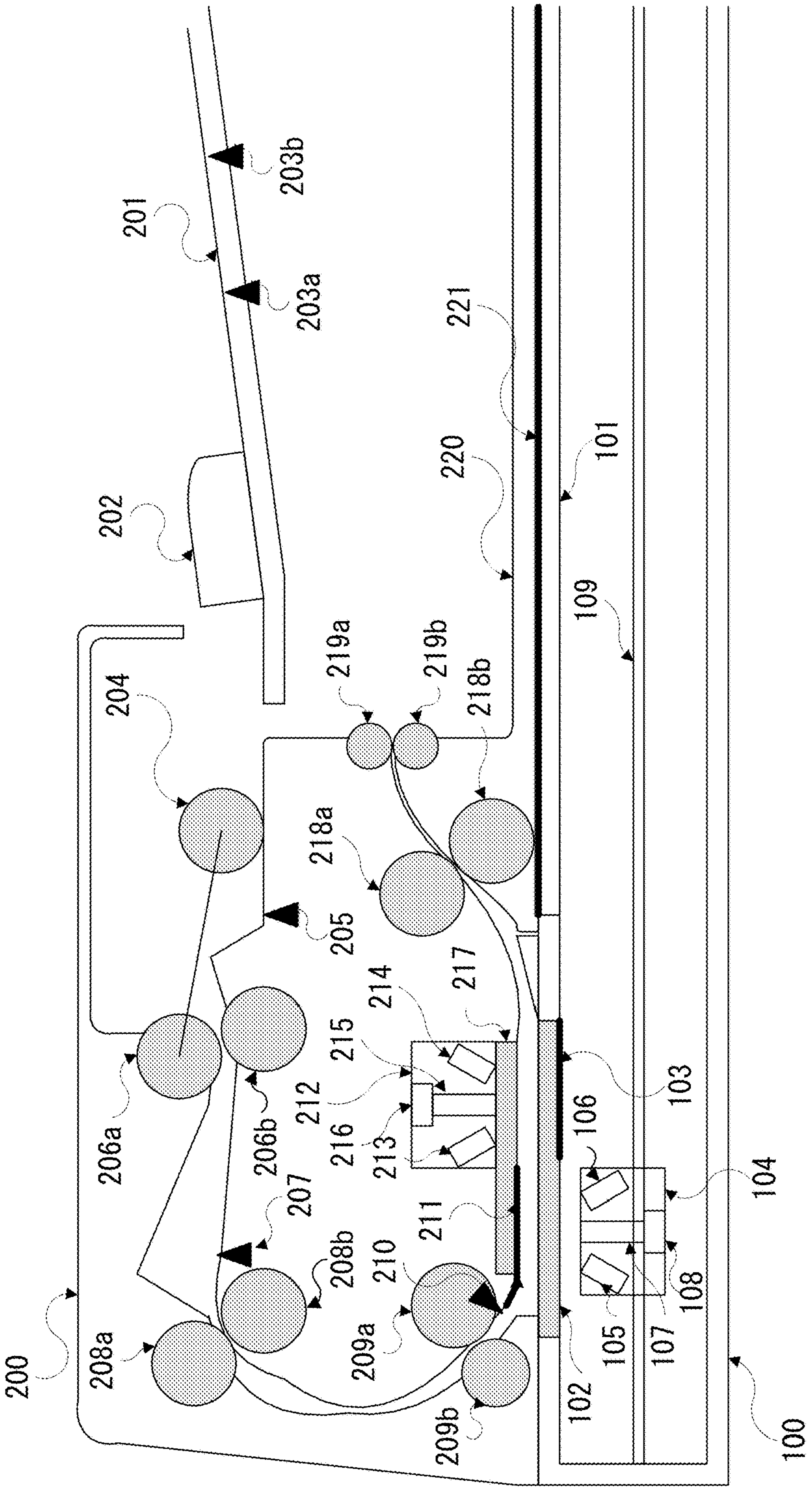
FIG. 2 is a sectional view of an image reading apparatus.

Hereinafter, an exemplary configuration of an image reading apparatus in at least one embodiment of the present disclosure is described in detail with reference to the accompanying drawings. FIG. 1 is a perspective view illustrating an example of an image reading apparatus 10 of the present embodiment. FIG. 2 is a sectional view illustrating an example of the image reading apparatus 10 of the present embodiment. In the present embodiment, the image reading apparatus 10 includes an image reading unit 100 configured to read a document image (image information) and an automatic document feeder 200 (hereinafter ADF 200), which is configured to convey a document towards the image reading unit 100.

Figure 3:
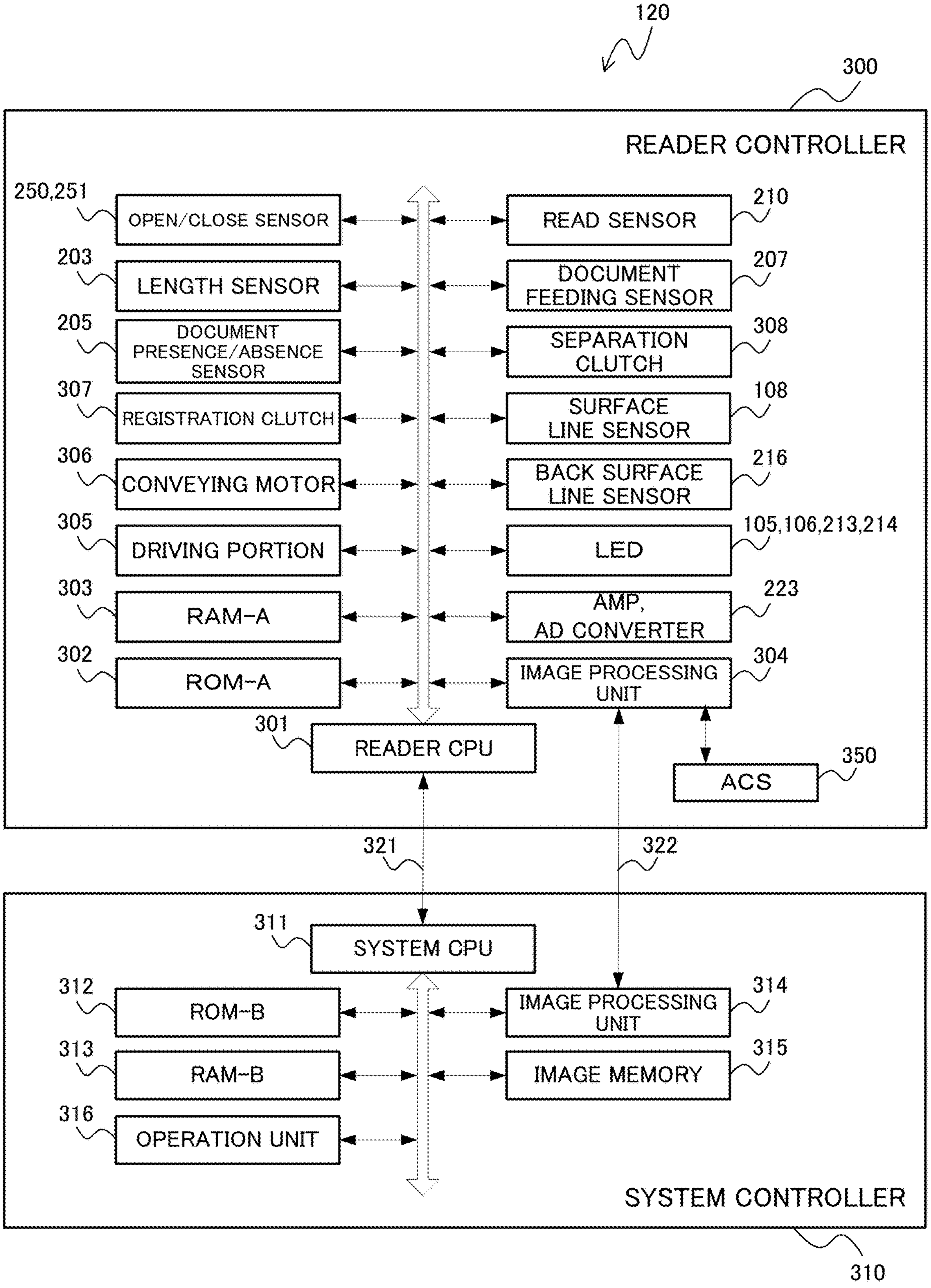
FIG. 3 is a functional block diagram of an automatic document reader.

Although not illustrated in FIG. 1, a control unit 120, which is illustrated in FIG. 3 described later, is formed in the image reading apparatus 10. The control unit 120 may be provided in the image reading unit 100 or the ADF 200. Otherwise, the image reading apparatus may be connected to the control unit 120 provided in an external apparatus (not shown) such as an image forming apparatus. The ADF 200 is connected to the image reading unit 100 to be openable and closable by open/close hinges 110*a* and 110*b* provided on a back side of an upper surface of the image reading unit 100.

<Structure Example of the Image Reading Unit>

The image reading apparatus 10 will be described with reference to FIG. 1 and FIG. 2.

Referring to FIG. 1, the image reading apparatus 10 includes a platen glass 101, a surface flow reading glass 102, and a white reference member 103 as a reference facing member. The surface flow reading glass 102 is integrated with the white reference member 103. The ADF 200 includes a document tray 201 on which a document bundle having one or more document sheets is to be stacked, a white reference member 211, a back surface flow reading glass 217, and a platen cover white plate 221. The white reference member 211 is integrated with the back surface flow reading glass 217.

Referring to FIG. 2, a surface reading unit 104 is installed in the image reading apparatus 10, and a back surface reading unit 212 is installed in the ADF 200. The document image on a surface of the document conveyed to the surface flow reading glass 102 by the ADF 200 is read by a surface reading unit 104. Further, the document image on the back surface of the document is read by the back surface reading unit 212. The image reading unit 100 includes the platen glass 101, a surface reading unit 104, a driving unit (not shown), a reading movement guide 109, and the white reference member 103.

The image reading unit 100 reads a surface image of the document by reading a surface of the document placed on the platen glass 101 line by line while moving the surface reading unit 104, with use of a drive unit (not shown), along with the reading movement guide 109. In FIG. 2, a reading movement guide is shown as a reading movement guide 109. The document placed on the platen glass is pressed and fixed by a platen cover white plate 221 in a case where the ADF 200 is closed.

<Configuration Example of the ADF 200>

Now, the ADF 200 will be described with reference to FIG. 2. The ADF 200 includes a document tray 201, on which a document bundle including at least one document sheet is stacked, and a separation mechanism. The separation mechanism includes a separation roller pair, i.e., separation rollers 206*a* and 206*b*, and a pickup roller 204. The separation rollers 206*a* and 206*b* prevent the document bundle from protruding downstream from the document tray 201 to thereby prevent the document bundle from moving downstream before starting conveyance of the document. The document tray 201 includes a document presence/absence sensor 205 which detects presence or absence of the document. The document tray 201 is provided with a tray width guide plate 202. By dropping the pickup roller 204 onto the uppermost surface of the document bundle S stacked on the document tray 201 and rotating the pickup roller 204, documents of the document bundle are conveyed. As to the documents conveyed by the pickup roller 204, the uppermost document is separated and conveyed by the action of the separation rollers 206*a* and 206*b*. This separation is realized by known separation techniques.

The document presence/absence sensor 205 is provided between the pickup roller 204 and the separation rollers 206*a* and 206*b*, whereby the presence/absence of the document can be detected. The document separated by the separation rollers 206*a* and 206*b* is conveyed to the register rollers 208*a* and 208*b* and is abutted against the register rollers 208*a* and 208*b*. The abutted tip of the document is formed in a loop, which prevents skew when conveying the document.

On the downstream side of the register rollers 208*a* and 208*b*, a conveying path for conveying the document which has passed through the register rollers 208*a* and 208*b* to the surface flow reading glass 102 is provided. The document conveyed to the conveying path is conveyed to a double-sided reading position by an upstream roller pair, i.e., upstream rollers 209*a* and 209*b*. A document feeding sensor 207 is provided between the separation rollers 206*a* and 206*b* and the register rollers 208*a* and 208*b*. A read sensor 210 is connected in the vicinity of the upstream rollers 209*a* and 209*b*. The document feeding sensor 207 and the read sensor 210 detect an edge of the document on the conveying path. The ADF 200 is also provided with a platen cover white plate 221.

In a case where a surface reading is performed, the document passing between the surface flow reading glass 102 and the back surface flow reading glass 217 is irradiated, from under the surface glass, by the surface LEDs 105, 106 when passing under the white reference member 211 integrated with the back surface flow reading glass 217. The reflected light from the document is read by a surface line sensor 108 through the surface lens array 107 to thereby the surface image of the document is read.

In a case where the double-sided reading is performed, the surface is read by the back surface reading unit 212 as described above. As to the back surface, it is irradiated by the back surface LEDs 213, 214 when passing over the white reference member 103 integrated with the surface flow reading glass 102. The reflected light thereof is read by the back surface line sensor 216 through the back surface lens array 215, thereby the back surface image of the document is read. The document conveyed by downstream rollers 218*a*, 218*b* is discharged on a discharge tray 220 by an output roller pair, i.e., output rollers 219*a*, 219*b*. In addition to the CIS shown in FIG. 2, the surface reading unit 104 and the back surface reading unit 212 may include a CCD having a reduction optical system using a surface lens array 107 and a mirror or the like.

<Structure of the Control Unit of the Image Reading/Reading Device>

FIG. 3 is a functional block diagram representing an exemplary configuration of the control unit 120 of the image reading apparatus 10 to which the ADF 200 is provided. The control unit 120 includes a reader controller 300 and a system controller 310. The reader controller 300 includes a reader CPU 301 which is a central processing unit, a ROM-A 302 which is a read-only memory, and a RAM-A

303 which is a random access memory. A control program is stored in the ROM-A 302, and input data and work data are stored in the RAM-A 303. A reader CPU 301 executes the control program in accordance with the flowcharts of FIG. 6 described later.

A conveying motor 306 for driving each roller for conveyance is connected to the reader CPU 301 in order to achieve a document conveying function. Some rollers, for example, the separation rollers 206*a* and 206*b* and the register rollers 208*a* and 208*b* are connected to the conveying motor 306 via a clutch which switches between driving and stopping. Further, the document presence/absence sensor 205 for detecting the document stacked on the document tray 201, the document feeding sensor 207 for detecting an edge of the document on the paper conveying path, the read sensor 210, an open/close sensor 250, 251, a length sensor 203, driving portion 305, a registration clutch 307, and a separation clutch 308 are connected to the reader CPU 301. The conveying motor 306 in this embodiment is a pulse motor, and the reader CPU 301 controls the number of drive pulses. The number of pulses can be converted into a conveying distance of the document during conveyance, and the reader CPU 301 controls each load and the like based on the conveying distance calculated based on the motor pulse to convey the document.

The surface LEDs 105 and 106 and the surface line sensor 108 are connected to the reader CPU 301 in order to achieve a function of reading the document image. The reader CPU 301 amplifies the image data read by the surface line sensor 108 with use of the amplifier (AMP) A/D converter 223, and converts it into a digital signal. The converted digital signal is further converted into image data in which one pixel is represented by 8 bits. In this case, the digital value "0" represents black and the digital value "255" represents white, and the digital data corresponds to brightness data (density) in 256 steps from 0 to 255.

The reader CPU 301 sends a result of an ACS determination (color determination) of the image data performed by an ACS determination device 350 provided in an image processing unit 304 of the reader controller 300 to the image processing unit 304. The reader CPU 301 executes various image processing on the image data using the image processing unit 304. The image data to which various image processes have been performed is sent to an image processing unit 314 in the system controller 310, which is described later, via an image data bus 322, and is stored in an image memory 315 after completing a predetermined image processing to the image data.

The reader CPU 301 notifies a vertical synchronization signal, which is a reference signal of a document edge in the document image data, and a horizontal synchronization signal, which is a reference of pixel tip of one line, to the system controller 310 through the command data bus 321 in synchronization with a document reading timing.

The system controller 310 includes a system CPU 311, ROM-B 312, a RAM-B 313, the image processing unit 314, an image memory 315, and an operation unit 316. The control program is stored in the ROM-A 302, and input data and work data are stored in the RAM-A 303. The system CPU 311 communicates with the reader CPU 301 for sending and/or receiving data related to the document reading control through the command data bus 321. The reader CPU 301 performs image processing to the image data obtained from the image processing unit 304 by the image processing unit 314, and stores, after completing the image processing, the image data in the image memory 315. The system CPU 311 performs an interface control with a user through the operation unit 316.

Hereinafter, with reference to FIG. 4A, FIG. 4B, FIG. 5A, and FIG. 5B, the relation of the color misregistration and erroneous determination in the ACS, i.e., an automatic color selection processing, is described. In FIG. 4A, FIG. 4B, FIG. 5A, and FIG. 5B, a vertical direction (between bottom and top) represents a scanning direction (sub-scanning direction), and the horizontal direction represents a width direction (main scanning direction) of a sensor. In the following description, a conveyance speed of the document in a case where a reading resolution in the sub-scanning direction is 600 dpi is twice the conveyance speed of the document in a case where the reading resolution in the sub-scanning direction is 300 dpi.

Figure 4A:
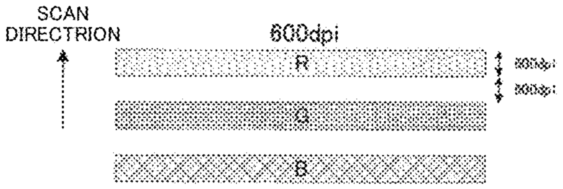
FIG. 4A and FIG. 4B are exemplary diagrams illustrating a line sensor arrangement of CMOS.

FIG. 4A illustrates an arrangement of line sensors R, G, and B when CMOS (Complementary Metal Oxide Semiconductor) with a resolution of 600 (dpi) in the sub-scanning direction is used as the surface reading unit 104. In this case, the line sensors R, G, and B are arranged at a distance of one line (in 600 (dpi)). Therefore, in a case where the resolution in the sub-scanning direction is 600 (dpi), each of the line sensors, for each color, reads the position shifted by 2 lines. Therefore, by digitally shifting the image obtained from each sensor 2 lines or 4 lines, a color image is formed. For example, as to the line sensor G, a color image is formed by digitally shifting the obtained image 2 lines. As a result, the reading position of the document between the line sensor R and the line sensor G becomes the same. Further, for the line sensor B, the color image is formed by digitally shifting the obtained image by 4 lines. As a result, the reading position of the document of each of the line sensors R, G, and B can be set to the same position.

Figure 4B:
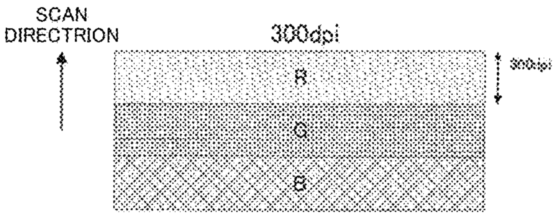

FIG. 4B illustrates an arrangement of the line sensors R, G, and B in a case where CMOS with a resolution of 300 (dpi) in the sub-scanning direction is used as the surface reading unit 104. In this case, each of the line sensors R, G, and B are arranged without line spacing and reads the position shifted by one line, therefore, the color image is formed by digitally shifting the images obtained from sensors by one line or two lines. For example, as to the line sensor G, a color image is formed by digitally shifting the obtained image by one line. As a result, the reading position of the document between the line sensor R and the line sensor G becomes the same. Further, for the line sensor B, the color image is formed by digitally shifting the obtained image by 2 lines. As a result, the reading position of the document of each of the line sensors R, G, and B can be set to the same position.

Figure 5A:
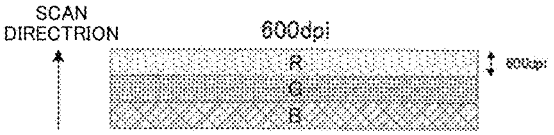
FIG. 5A and FIG. 5B are exemplary diagrams illustrating a line sensor arrangement of CIS.

FIG. 5A illustrates an arrangement of the line sensors R, G, and B in a case where CIS with a resolution of 600 (dpi) in the sub-scanning direction is used as the surface reading unit 104. In the CIS, the line sensors are usually arranged so that there is no gap between them for reducing cost and for reducing equipment. In this case, each of the line sensors R, G, and B are arranged without line spacing and reads the position shifted by one line, therefore, the color image is formed by digitally shifting the images obtained from sensors by one line or two lines. For example, as to the line sensor G, a color image is formed by digitally shifting the obtained image one line. As a result, the reading position of the document between the line sensor R and the line sensor G becomes the same. Further, as to the line sensor B, the color image is formed by digitally shifting the obtained image by 2 lines. Thus, as to each of the line sensors R, G, and B, the reading position of the document can be set to the same position.

Figure 5B:
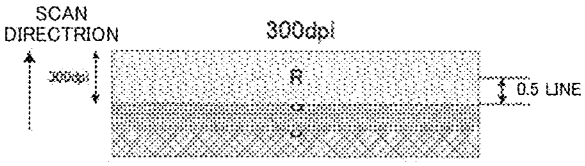

FIG. 5B illustrates an arrangement of the line sensors R, G, and B in a case where CIS with a resolution of 300 (dpi) in the sub-scanning direction is used as the surface reading unit 104. Unlike FIG. 5A, in a case where the resolution is 300 (dpi), the line sensor of each color reads the position of the document shifted by 0.5 line in the sub-scanning direction (SCAN direction). The shift amount of each line sensor is not an integer, therefore, even if the image obtained from each sensor is digitally shifted, it is not possible to correct the shift amount in unit of 0.5 line. Therefore, the reading positions of the document of the line sensors R, G, and B cannot be the same. As a result, for example, in a case where the black line of the document is read, the edge portion of the black line is determined to be a chromatic color. That is, an erroneous determination occurs in automatic color selection executed by the ACS determination device 350. fffffIn the above description, the surface reading unit 104 has been described, however, the same applies to the back surface reading unit 212.

<Reading Resolution Switching Control in ACS>

Figure 6:
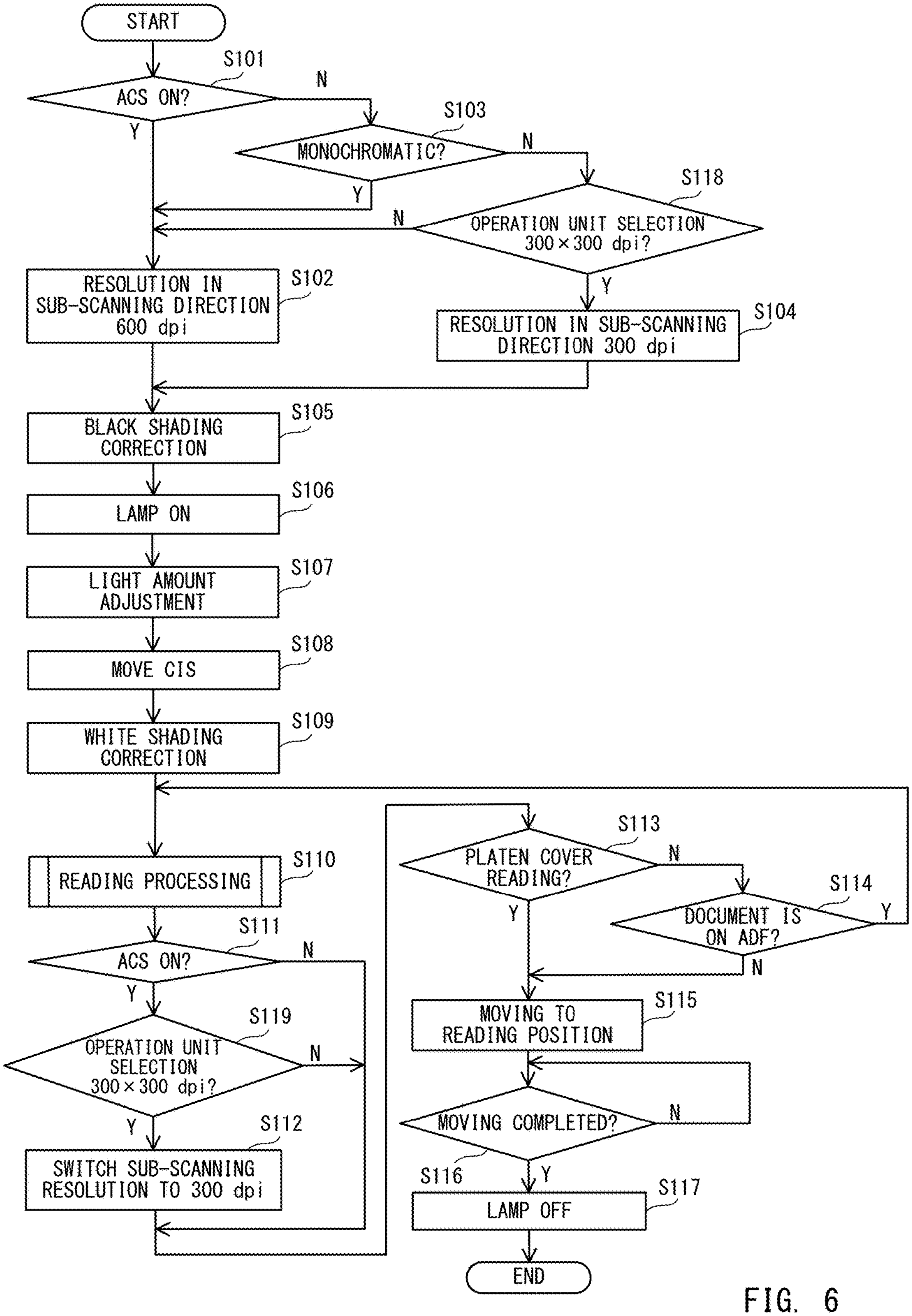
FIG. 6 is a flow chart illustrating a reading process.
Figure 7:
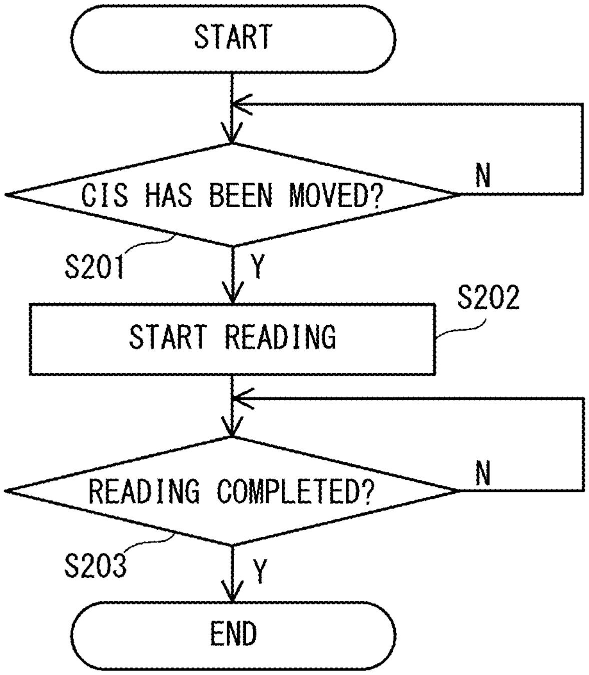
FIG. 7 is a flow chart illustrating a reading process.

FIG. 6 and FIG. 7 are flowcharts representing reading control processing for reading resolution switching of the image reading apparatus 10 in the ACS. The ACS is achieved by the reader CPU 301 by reading the program stored in the ROM-A 302 into the RAM-A 303 to configure and execute the ACS determination device 350. Each parameter used in the processing shown in FIG. 6 and FIG. 7 is read into a storage device, by the CPU 301, such as a RAM-A 303 before starting the processing.

Further, FIG. 8A and FIG. 8B illustrate, for each of the platen cover reading and the flow reading, reading resolutions which are set when actually reading the document, resolutions selected by the user through the operation unit 316, and the ACS setting input by the user. The operation unit 316 has a function to operate as resolution receiving means for receiving a resolution which is set for image reading. The reading resolution is expressed as "resolution in the main scanning direction (dpi)*resolution in the sub-scanning direction (dpi)". For example, the reading resolution (300*600) in the platen cover reading indicates that the resolution in the main scanning direction is 300 (dpi) and the resolution in the sub-scanning direction is 600 (dpi). Both in the main scanning direction and the sub-scanning direction, the resolution of 300 (dpi) or 600 (dpi) is selectable.

<Explanation of ACS>

Hereinafter, the processing performed by the image reading apparatus when the reading resolution in the sub-scanning direction is switched will be described. Further, in the following, an exemplary embodiment in which the document image is read by using CIS will be described. In this embodiment, since CIS is used for both the surface reading unit 104 and the back surface reading unit 212, only the surface reading unit 104 will be described. However, the present invention is not limited to the CIS.

With reference to FIG. 8A and FIG. 8B, when the user selects the ACS through the operation unit 316 in color selection, the ACS setting is "ON", and when the user does not select the ACS (in this case, the user selects color or black and white), the ACS setting is "OFF". In this embodiment, the ACS setting is set by the user, however, the ACS setting may be automatically set instead of setting by the user, for example, the ACS setting may be automatically turned on periodically. When the ACS setting is "OFF" and the user has specified that the document image is color or monochrome through the operation unit 316, the reader CPU 301 sets the reading resolution of the document image to be the same as the resolution selected by the operation unit 316.

On the other hand, when the ACS setting is "ON" and the output resolution set by the user through the operation unit 316 is 300*300 (dpi), the reader CPU 301 sets the reading resolution (dpi) in the reading unit to 300*600 (dpi). Then, the reader CPU 301 sets the output resolution (dpi) to be output from the reader controller 300 to the system controller 310 as 300*600, and the system controller 310 converts the resolution in the sub-scanning direction from 600 (dpi) to 300 (dpi). The above applies to the platen cover reading in FIG. 8A and the flow reading and FIG. 8B.

Now, the ACS is described with reference to FIG. 6 and FIG. 7. Unless otherwise stated, it is the reader CPU 301 control that controls the ACS. When the user instructs the reader CPU 301 to start the reading operation through the operation unit 316, the reader CPU 301 sets the resolution in the sub-scanning direction to either 600 (dpi) or 300 (dpi), according to a reading mode notified from the system controller 310. It is noted that the reading modes include an ACS mode, a color mode, and a monochrome mode. The reader CPU 301 determines whether or not the ACS is set to "ON" by the user (Step S101). When the ACS is set to "ON" (Step S101: Y), the reader CPU 301 sets the resolution in the sub-scanning direction to 600 (dpi) (Step S102).

Next, the reader CPU 301 performs, before reading the document image, a black shading correction in order to obtain a uniform output signal from the surface line sensor 108. In the black shading correction (Step S105), the surface LEDs 105 and 106 are turned off, and in this state, by reading the white reference member 103 provided at the end of the platen glass 101, the black level output signal (luminance: low) is obtained. Then, using the obtained black level output signal, black level distortion of each pixel in each main scanning direction is corrected. The reader CPU 301 turns on the lamps (surface LEDs 105 and 106) (Step S106), then performs a light amount adjustment (Step S107) in order to keep the amount of exposure of the surface LEDs 105 and 106 to be constant. In the light amount adjustment, the output signals of the surface LEDs 105 and 106 are adjusted using an AMP and A/D converter so as to keep the amount of exposure of the surface LEDs 105 and 106 to be constant and to amplify the same.

The reader CPU 301 moves the surface reading unit 104 (CIS) (Step S108). After that, the reader CPU 301 performs, using a white level output signal (luminance: high) obtained by reading the white reference member 103 provided at the end of the platen glass 101, a white shading correction (Step S109) in order to correct white level distortion of each pixel in each main scanning direction.

Then, the reader CPU 301 executes the reading processing (Step S110). The details of the reading processing are illustrated in FIG. 7. In the reading processing, the reader CPU 301 determines whether the surface reading unit 104 has been moved to a predetermined position (Step S201) or not. In a case where the movement is not completed (Step S201: N), the reader CPU executes Step S201 again. In a case where the movement of the surface reading unit 104 is completed (Step S201: Y), the reader CPU 301 starts reading of the document image (Step S202) and determines whether the reading is completed or not (Step S203). In a case where the reading is not completed (Step S203: N), the CPU executes Step S203 again.

By performing the ACS on the document image which has been read as described above, the ACS determination device 350 determines whether the document image is chromatic ("color" in the present embodiment) or achromatic ("monochrome" in the present embodiment). Then, in S111 and subsequent steps, the reader CPU 301 reads the document image in the color or monochrome mode by using the determination result.

When the reading is completed (Step S203: Y), the processing returns to FIG. 6, and the reader CPU 301 determines whether the ACS is "ON" or not (Step S111). When the ACS is "ON" (Step S111: Y), the reader CPU 301 determines whether the resolution selected, through the operation unit 316, by the user is 300*300 (dpi) (Step S119). In a case where the resolution is 300*300 (dpi) (Step S119: Y), the reader CPU 301 notifies the system CPU 311 of the system controller 310 of the result. The system controller switches the sub-scanning resolution in the image processing unit 314 to 300 (dpi) (Step S112). After that, the reader CPU 301 determines whether or not the platen cover reading is selected (Step S113). In a case where the determination result is "N" in S111 (Step S111: N), and when the determination result is "N" in Step S119 (Step S119: N), the CPU 301 performs Step S113.

When the platen cover reading is selected (Step S113: Y), the CPU 301 performs the platen cover reading to read the document image of the document placed on the platen glass 101, and moves the surface reading unit 104 to a standby position (a position under the white reference member 103). On the other hand, when the platen cover reading is not selected in Step S113 (Step S113: N), the CPU 301 determines whether the document is on the ADF (Step S114) or not. In a case where the document is in the ADF (Step S114: Y), the reader CPU 301 separates and feeds the documents placed on the document tray 201 by the ADF 200, and conveys them one by one to read the surface thereof using the surface reading unit 104. Further, when the double-sided reading is selected by the user through the operation unit 316, the CPU 301 also performs reading by the back surface reading unit 212. After that, the reader CPU 301 performs Step S110 again. In a case where the document is not on the ADF (Step S114: N), the reader CPU 301 moves the surface reading unit 104 to the reading position (Step S115).

After executing Step S115, the reader CPU 301 determines whether the movement of the surface reading unit 104 to the standby position is completed (Step S116). If it is not completed, the reader CPU 301 performs Step S116 again, and if it is completed (Step S116: Y), the CPU 301 turns off the lamp (Step S117) and the processing is completed.

Now, with reference to FIG. 8A and FIG. 8B, the processing when the ACS is not "ON" in Step S101 (Step S101: N) will be described. In this case, the user has selected color or monochrome without selecting ACS, thus the ACS setting is "OFF". Further, when the ACS setting is OFF, the reading resolution is the same as the output resolution. Accordingly, in FIG. 8A and FIG. 8B, the reading resolution and the output resolution are the same when the output resolution of the operation unit selection is 300*300 (dpi), and when the output resolution of the operation unit selection is 600*600 (dpi).

When starting the reading operation, the reader CPU 301 reads the resolution in the sub-scanning direction at 600 (dpi) or 300 (dpi) according to the selected reading mode notified by the user through the system controller 310. Therefore, the reader CPU 301 determines whether the monochromatic reading mode is selected or not (Step S103), and in a case where the monochromatic reading mode is selected (Step S103: Y), the reader CPU 301 proceeds to Step S102 and sets the sub-scanning resolution to be 600 (dpi) and performs Step S105 and the subsequent steps.

When the monochromatic reading mode is not selected (Step S103: N), the color reading mode is selected. In this case, the reader CPU 301 determines whether the resolution selected by the operation unit 316 is 300*300 (dpi) or not (Step S118). In a case where the resolution is 300*300 (dpi) (Step S118: Y), the reader CPU 301 sets the resolution in the sub-scanning direction to 300 (dpi) (Step S104), and performs Step S105 and the subsequent steps.

On the other hand, when the resolution selected by the operation unit 316 is 600×600 (dpi), i.e., not 300×300 (dpi) (Step S118: N), the CPU 301 sets the sub-scanning direction resolution to 600 (dpi) (Step S102), and performs Step S105 and the subsequent steps. The processing of Step S105 and the subsequent steps are the same as the steps performed by the reader CPU 301 in a case where the determination result of Step S101 is "Y". It is noted that, in a case where the ACS is "OFF" after the reading processing in Step S110, the sub-scanning resolution is not changed.

As described in the above, in the present embodiment, in a case where the ACS is performed, even if the resolution in the sub-scanning direction selected by the user is 300 (dpi), the image reading is performed with the resolution in the sub-scanning direction being 600 (dpi) and each reading position of the respective color is the same. Therefore, the color misregistration upon reading a line is prevented, thus, an erroneous determination in the ACS is prevented. Further, in an image reading apparatus, an erroneous determination in determining whether an image of a document is an achromatic image or a chromatic image can be prevented.

In the above description, both the surface reading unit 104 of the image reading apparatus 10 and back surface reading unit 212 use the CIS. Further, the reading resolution switching in the ACS, as described with reference to FIGS. 6-8B, is commonly applied in each of surface reading unit 104 and back surface reading unit 212.

However, it is possible to use the CIS in one of the surface reading unit 104 and the back surface reading unit 212 and use CMOS (or any type of line sensors other than the CIS) for the other, for example. In this case, for example, the reader CPU 301 determines, at the time of starting the image reading processing, whether the CIS is used in reading an image or not. In a case where the CIS is used, the reader CPU 301 performs the reading resolution switching in the ACS as described with reference to FIGS. 6-8B. On the other hand, in a case where the CIS is not used, the resolution input by the user through the operation unit 316 is used as the reading resolution in the ACS.

Although the resolution of 300 (dpi) and 600 (dpi) are described as the resolution of CIS in the present disclosure, the resolution is not restricted to these values. Further, the present invention is not restricted to the CIS, and the present invention can be also applied to line sensors in which the reading positions of the document in the line sensors R, G, and B may not be the same.

According to the present disclosure, it is possible to prevent, in an image reading apparatus, an erroneous determination in determining whether an image of a document is an achromatic image or a chromatic image. Further, though the present embodiment has been explained for the color document and the monochrome document, the present invention is also applicable to a chromatic document and an achromatic document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018310, filed Feb. 5, 2020, which is hereby incorporated by reference herein in its entirety.

What is claimed is:

1. An image reading apparatus, comprising:

a conveyor configured to convey a document;

a reader configured to read an image of the document being conveyed by the conveyor using a sensor, the sensor comprising:

a first light receiving element row having a plurality of light receiving elements, which receive light of a first color, arranged in a first direction; and a second light receiving element row having a plurality of light receiving elements, which receive light of a second color, arranged in the first direction, wherein the first light receiving element row and the second light receiving element row are arranged in a second direction orthogonal to the first direction, and at least one processor configured to settably determine whether the image read by the reader is a chromatic image or an achromatic image based on the image read by the reader, wherein, in a case where the at least one processor is set not to determine whether the image read by the reader is a chromatic image or an achromatic image and an output resolution is set to a first resolution, the conveyor is configured to convey the document at a first speed and the at least one processor is configured to output the image read by the reader at the first resolution, wherein, in a case where the at least one processor is set not to determine whether the image read by the reader is a chromatic image or an achromatic image and the output resolution is set to a second resolution higher than the first resolution, the conveyor is configured to convey the document at a second speed slower than the first speed and the at least one processor is configured to output the image been read by the reader at the second resolution, wherein, in a case where the at least one processor is set to determine whether the image read by the reader is a chromatic image or an achromatic image, the conveyor is configured to convey the document at the second speed regardless of whether the output resolution is set to the first resolution or to the second resolution, and the at least one processor is configured to determine whether the image read by the reader is a chromatic image or an achromatic image based on the image read by the reader.

2. The image reading apparatus according to claim 1, wherein, in a case where the at least one processor is set to determine whether the image read by the reader is a chromatic image or an achromatic image and the resolution is set to the first resolution, the at least one processor converts an image obtained by reading by the reader of the document conveyed at the second speed by the conveyor and having the second resolution, into an image having the first resolution and outputs the image having the first resolution, and wherein, in a case where the at least one processor the at least one processor is set to determine whether the image read by the reader is a chromatic image or an achromatic image and the resolution is set to the second resolution, the at least one processor outputs an image obtained by reading by the reader of the document conveyed at the second speed by the conveyor and having the second resolution.

3. The image reading apparatus according to claim 1, wherein the first light receiving element row and the second light receiving element row are arranged in the second direction such that positions of the first light receiving element row and the second light receiving element row read are shifted by 0.5 line in the second direction from each other in the first resolution.

4. The image reading apparatus according to claim 1, wherein the first light receiving element row and the second light receiving element row of are arranged in the second direction such that positions of the first light receiving element row and the second light receiving element row read are shifted by one line in the second direction from each other in the second resolution.

5. The image reading apparatus according to claim 1, wherein the sensor is CMOS (Complementary Metal Oxide Semiconductor).

6. The image reading apparatus according to claim 1, wherein the sensor is CIS (Contact Image Sensor).

* * * * *